United States Patent [19]

Harris

[11] Patent Number: 4,965,432
[45] Date of Patent: Oct. 23, 1990

[54] PORTABLE VEHICLE HEATER

[76] Inventor: Jack W. Harris, 125 Flanders Rd., Woodbury, Conn. 06798

[21] Appl. No.: 376,638

[22] Filed: Jul. 7, 1989

[51] Int. Cl.⁵ .............................................. B60H 1/22
[52] U.S. Cl. ..................................... 219/203; 98/2.08; 392/367
[58] Field of Search ............... 219/202, 203, 369, 370, 219/373; 98/2.01, 2.02, 2.08

[56] References Cited

U.S. PATENT DOCUMENTS

| | | | |
|---|---|---|---|
| 2,537,330 | 1/1951 | Carroll | 219/202 |
| 2,574,949 | 11/1951 | Behman et al. | 219/202 |
| 2,827,540 | 3/1958 | Underwood | 219/202 |
| 3,221,138 | 11/1965 | Hercher | 219/202 |
| 3,496,855 | 2/1970 | Boer | 219/202 |
| 3,524,044 | 10/1970 | Liardi | 219/202 |
| 3,671,714 | 6/1972 | Charns | 219/203 |
| 4,034,204 | 7/1977 | Windsor et al. | 219/202 |
| 4,232,211 | 11/1980 | Hill | 219/202 |
| 4,293,759 | 11/1981 | Higgins | 219/202 |
| 4,350,287 | 9/1982 | Richards | 219/202 |

Primary Examiner—Roy N. Envall, Jr.

[57] ABSTRACT

A device for temporary positioning in the interior of a vehicle for warming and defrosting through one or more resistance electric heater/blowers controlled by a timer connected to an exterior AC power source with an optional ground fault interrupter circuit. The attachment arm is preferably a tough, flexible elastomeric band having flat wire conductors extending therethrough from the device to the exterior of the vehicle.

21 Claims, 3 Drawing Sheets

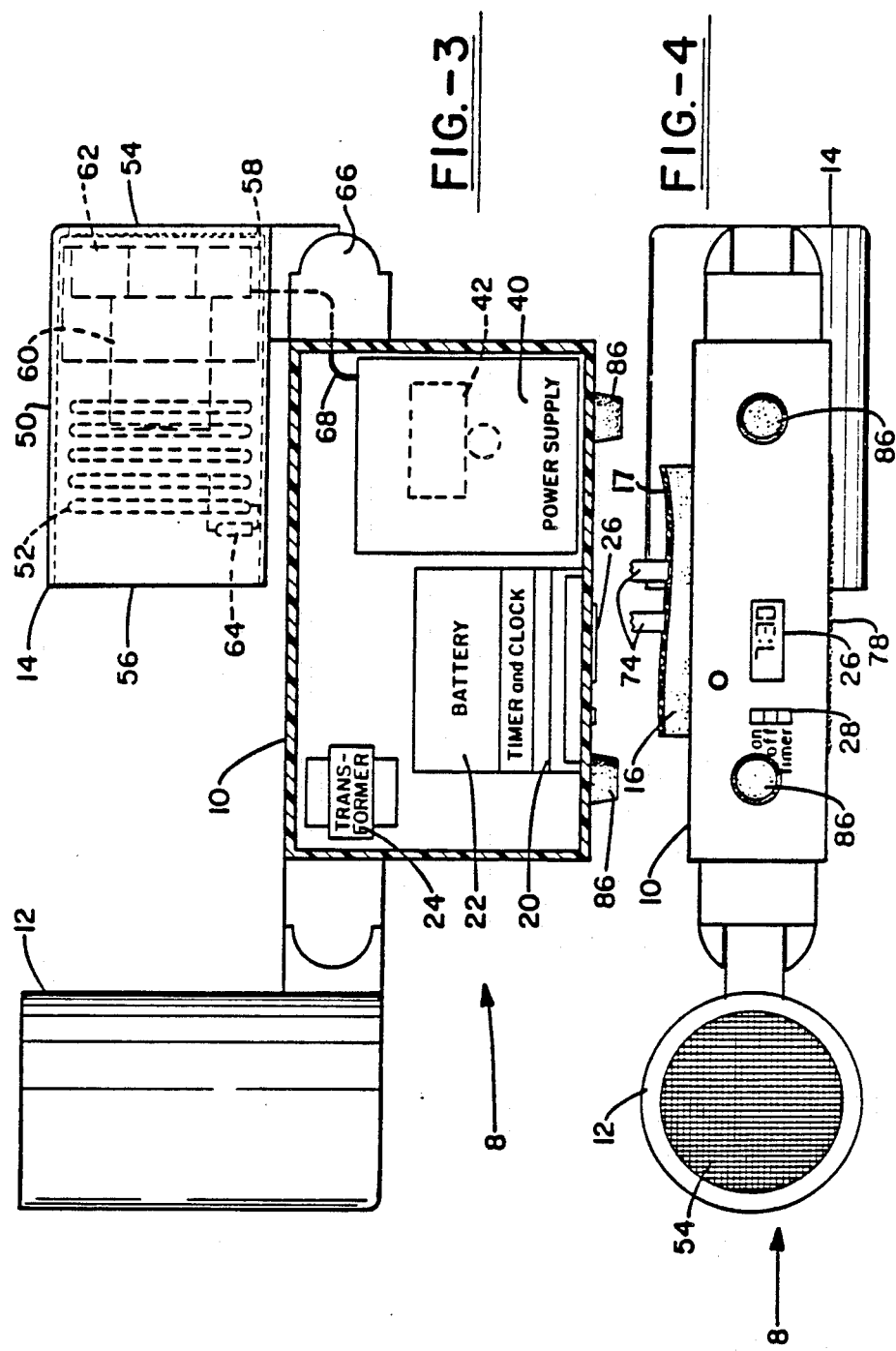

PORTABLE VEHICLE HEATER

BACKGROUND OF THE INVENTION

This invention relates to automotive heating systems and particularly such a system which is portable and removable from the automobile. The perennial problem of entering a cold automobile which has been parked either outdoors or in an unheated garage is a well-known problem for most people. The prior art contains many attempts directed at solving the problem by building various descriptions of units into portions of the car such as the back deck behind the rear seat. There are also proposed many systems which utilize the heating fluids from the engine in conjunction with minor auxiliary electric heating devices for heating systems built into the dashboard area of an automobile. It is to be understood and appreciated that, while the device of this invention is described as an automobile heater, it of course may be used in many other vehicle types including trucks, mobile homes and heavy equipment vehicles.

SUMMARY OF THE INVENTION

An object of this invention is to provide a fully portable device which can be installed and removed from a vehicle easily. In one aspect of the invention, the mounting apparatus can be simply slipped through the open car door and fixed in place by firmly closing the door. A further object of the invention is to provide a device in which the heated air may be directed in two different directions to simultaneously achieve several purposes including defrosting windows and heating the car at the same time. In yet another aspect of the invention, a timer is provided which can automatically be programmed to operate several times a day to accommodate the particular schedule of the user. Another object of the invention is to provide a device which includes a timer which has a clock mechanism which is continuously accurate despite disconnection from the AC power source.

Yet another object of the invention is to provide a safe and portable device which incorporates a ground fault interrupter circuit to assure no electrical hazard exists between the AC power source and the vehicle which is being heated. Yet another object is to provide a very light weight unit to enhance the portability object already set forth.

These objects, advantages and features together with others which will become apparent following the detailed description of the invention are all provided by various embodiments of the device of this invention. Reference may be made to the accompanying drawings which form a part of this description.

BRIEF DESCRIPTION OF DRAWINGS

FIG. 3 is a view partly in plan, partly in sectional view illustrating the internal components of the device.

FIG. 4 is a rear elevation view of the device.

FIG. 5 is a partial bottom view of the device.

DETAILED DESCRIPTION OF THE INVENTION

Figure 1:
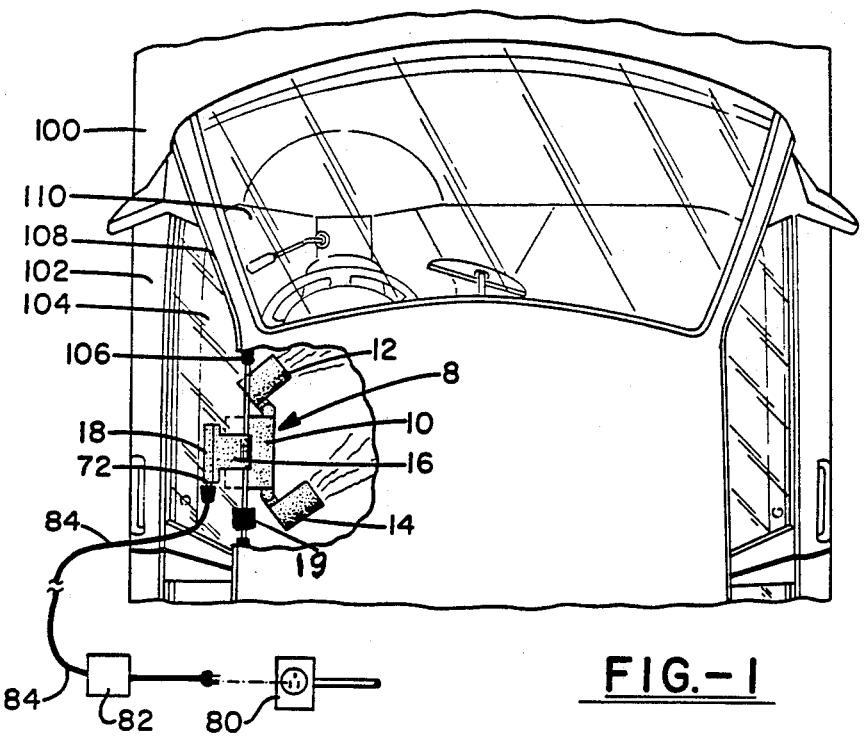
FIG. 1 is a top view of the heating device in its operating position in a vehicle.

The following description is set forth in conjunction with the accompanying drawings FIG. 1 through FIG. 5. The portable vehicle heater 8 is shown in each figure. The following description is directed to FIGS. 1, 2 and 3. The housing 10 is a rectangular enclosure which can be formed of any suitable material including plastic, wood, metal, etc. Attached to the housing 10 are a pair of heater/blower assemblies 12, 14 which are mounted on opposing sides of the housing 10. Another major component is the window attachment arm 16 which has incorporated as a part thereof an electrical connector 18 located on the terminus of the window attachment arm most distant from where the arm 16 attaches to the housing 10. Enclosed within the housing is a timer assembly 20 which includes a DC battery 22 along with a transformer 24 which is used to charge the DC battery 22. On the rear face of the housing which is shown in FIG. 4 in rear elevation, the timer includes a time display 26 and a timer switch 28 which controls the operation of the timer which an on and off bias configuration. The timer controls 30 are shown on the partial bottom view in FIG. 5. These timer controls are used to the clock which is shown in the time display 26 as well as the timer which may be programmed from a plurality of on and off sequences during a given 24 hour day. The timer is battery operated and continues to maintain the accurate time and timing function regardless of whether the unit is attached to an AC power source.

Also included within the housing is the power supply 40 and included therein is a relay 42 which converts the signal from the timer to an electrical signal which turns the AC current on and off via the relay 42. When the relay is activated by the timer, AC power is sent to the heater/blower assemblies 12 and 14, one of which is shown in the cutaway section of FIG. 3. The heater ducting 50 is a generally cylindrical shroud containing heating elements 52, an inlet 54 and an outlet 56. It is understood that unheated ambient air is drawn through the inlet 54 by the operation of a blower 58 composed of a fan 60 and a motor 62. The air is forced through the heating elements 52 and is heated to the appropriate temperature prior to exiting through outlet 56. A thermostatic cutout 64 is provided adjacent to the outlet 56 to assure that the exiting air does not get overheated. The thermostatic cutout 64 will disengage the electrical supply if such overheating occurs for any reason whatsoever. This feature enhances the safety of the unit in operation.

Figure 2:
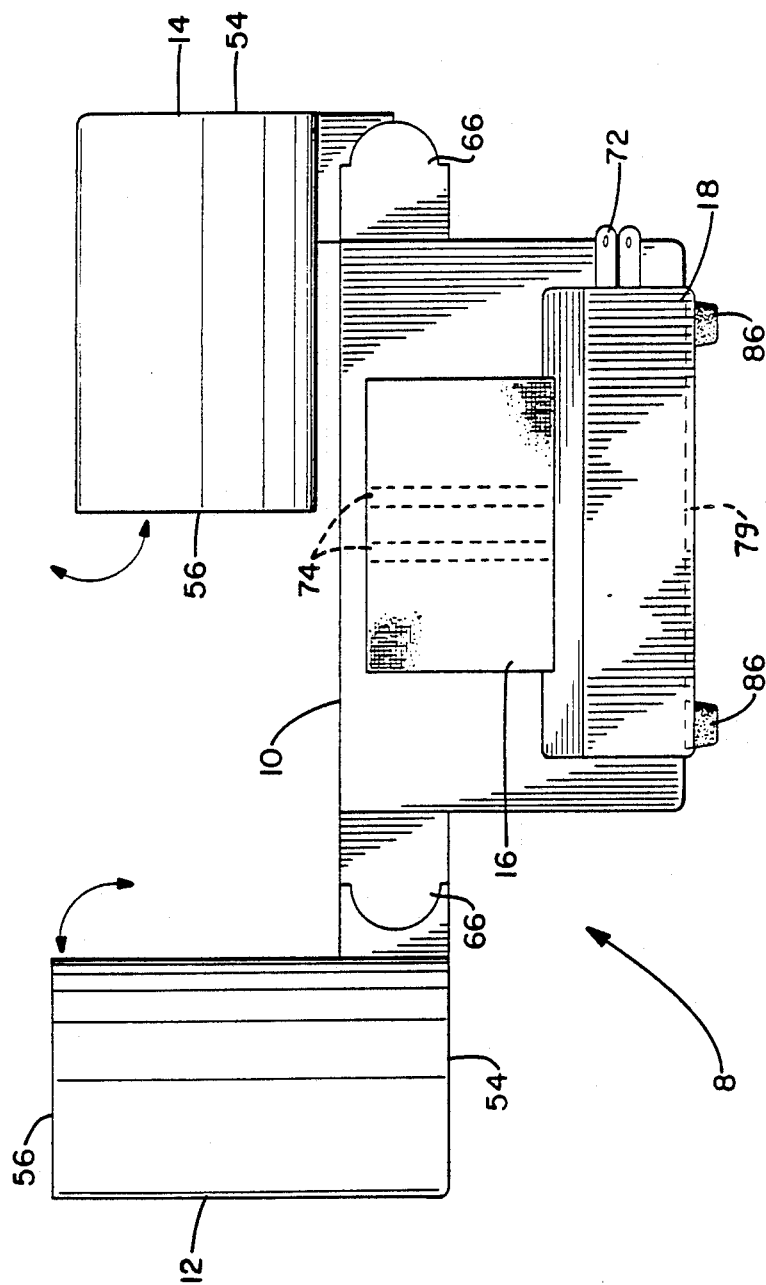
FIG. 2 is a plan view of the device.

The heater/blower assemblies 12 and 14 are both mechanically and electrically connected to the housing 10. The mechanical linkage is shown in the preferable mode using the pivotal hinge 66. Of course, in other embodiments the assemblies 12 and 14 may be fixedly attached to the housing in other suitable hinging means. It is most desirable that the assemblies 12 and 14 be capable of articulation in relation to the housing so that air flow from the outlet 56 can be directed in a preferred direction. By having two assemblies 12, 14 and mounting the portable heater through the one of the front door 104 or window assemblies 108 of the vehicle 100, the heater/blower assembly 12 can be directed toward the front windshield 110 for defrosting purposes and the other assembly 14 may be directed into the main compartment of the automobile. For the purposes of electrical connection, it is understood that an electrical conductor 68 is routed through the hinge into the power supply 40 within the housing 10. The window attachment arm 16 is a flexible, deformable and substantially flat band of tough, flex fatigue resistant material which in the preferred embodiment shown contains a flat wire conductor 74 which conducts the electrical current from the electrical connector 18 which is attached to the distal end of the arm 16. The electrical connector 18 includes a male plug 72. One means of storing the window attachment arm in a convenient manner is shown in FIGS. 2 and 4 where a velcro strip 79 is adhered to the electrical connector 18 and, when in the storage position which is shown in hidden lines in FIG. 2, the velcro strip 79 attaches to a companion velcro strip 78 which is adhered to the appropriate place on the housing 10. By use of this convenient attachment means, the window attachment arm 16 can be conveniently wrapped around the housing in order to achieve a very small and convenient package for the unit when it is not in use. This is a great enhancement to the portability of the device.

The electrical connection of the unit to the AC power source 80 is shown in simple schematic form in FIG. 1. The power source 80 is of course an electrical outlet in a garage, carport or other convenient location. The electrical power source is most preferably connected to a ground fault interrupter circuit 82 which is a well-known device for protecting against electrical shock. The ground fault interrupter circuit continuously monitors the outgoing and incoming current in the circuit and, if there is any variance, the circuit is discontinued. A drop cord 84 electrically connects the power source 80 with the connector 18. Any conventional electrical hookup can be substituted for the indicated schematic portion of the invention.

The housing 10 is suspended from the window 104 or door 102 of the vehicle 100, and the housing as oriented in FIG. 1 rotates 90 degrees downward and is provided with an optional set of bumpers 86 which protect both the window surface and the housing from damage.

Alternative Embodiments

As an alternative to a pair of heater/blower assemblies 12, 14, applications for some vehicles may require only one heater/blower assembly and others may require three or more. The heater/blower assemblies may be of circular or rectangular cross-section.

As an alternative to the door/window attachment arm 16, a plastic or metal hanger 19 or clip may be used. This can be attached to the window 104, to the door 104, or to the drip channel 108 and extend through the door gasket 106. In this instance, the electrical conductor would be either built into the hanger or clip or routed separately to the electrical connector 18.

In other embodiments any or all of the following elements—the timer 20, the timer controls 30, the timer switch 28 and the time display 26—may be located remotely near the power source 80 and may or may not be combined with the ground fault interrupter 82.

In other embodiments the assemblies 12, 14, or other assemblies that replace them in these other arrangements, may be automatically oscillated either continuously or intermittently to distribute the air flow throughout the vehicle.

Door/window attachment arm 16 may be easily disconnectable from the housing 10 both electrically and mechanically to facilitate replacement of the door/window attachment arm 16 with another similar attachment arm in case of damage or with another attachment arm of different design for special mounting conditions encountered in certain vehicles The means of disconnecting and reconnecting attachment arms might be suitable mechanical and electrical plugs with clasps and releases which together make secure electrical and mechanical connections.

As an alternative to a pair of heater/blower assemblies 12, 14 a single heater/blower assembly of rectangular or circular cross-section might be used. The incorporation of the timer and other components might be made into the housing of the single heater/blower assembly so that the complete heater 8 is quite compact.

The heater/blower assemblies may be constructed so they may be easily removed and disconnected electrically and mechanically from the housing by means of electrical plugs and quick disconnecting screws, pins or other fasteners.

The bumpers 86 may be designed so that they adjust inward and outward to better accommodate the contour of various vehicles An additional part called a support bracket may optionally be added which is attached to the door/window attachment arm 16. It provides a supplemental attachment to the window by means of a hook to support the entire portable vehicle heater 8 (PVH) while the vehicle door 102 is being opened so that the installation and removal of the unit can be done with one hand. This support bracket might be adjustable up and down the door/window attachment arm to accommodate different vehicles and assist in establishing the proper hanging height for the heater 8. The support bracket would protrude out from arm 16 and would fold away so as not to interfere with the wrapping of the door/window attachment arm 16 into the storage position around the housing, shown best in FIG. 2.

In other arrangements, the heater unit 8 might be suspended from some other part of the vehicle interior such as the rear view mirror or the clothes hanger hook and an electrical cord 84 used to connect the power supply to the electrical connector 18 might be routed through the window 104 or door gasket space 106. A short segment of flat wire 74 might be used to facilitate the routing of the electrical conductors through the small window or door gasket space 106.

The flat wire conductor 74 element of the invention is understood to encompass a whole class of conductors designed to have a low profile in one dimension or direction. A common form has a rectangular cross-section in which the ratio of wide dimension to narrow dimension would have from greater that 12:1 to about 3:1 or less. The conductor may be in a stranded, solid or braided configuration. The braid may be foreshortened and flattened to form the desired conductor form.

While certain embodiments of the invention have been illustrated and described, it is understood that modifications and changes to components are still within the ambit of the invention so long as they are within the scope of the appended claims.

What is claimed is:

1. A portable vehicle heater comprising:
   (a) a housing;
   (b) a plurality of ducts attached electrically and mechanically to said housing, each having an inlet and an outlet with electrical heating means and a blower means positioned within said ducts, between said inlet and between said outlet;
   (c) a manually settable timer means connected to an electrical relay means adapted to selectively interrupt the electrical continuity of an electrical connection between said heating means and blower means and an AC power source; and (d) an attachment arm of a tough, flexible band flexibly connected to said housing having incorporated therein a plurality of electrical conductors connecting an electrical connector to said relay means and being attached to the end of said band distal of said housing.

2. A heater according to claim 1 wherein said conductor in said band is a plurality of flat wire conductors embedded within said tough, flexible band.

3. A heater according to claim 1 wherein said attachment arm is composed of a tough, elastomeric polymer web connecting said housing to said electrical connector.

4. A heater according to claim 3 wherein said tough, elastomeric polymer web has incorporated therein a plurality of reinforcement fibers embedded within said web.

5. A heater according to claim 1 further comprising an abrasion resistant layer being secured to said attachment arm.

6. A portable vehicle heater comprising:
(a) a housing;
(b) a plurality of ducts attached electrically and mechanically to said housing, each having an inlet and an outlet with electrical heating means and a blower means positioned within said ducts, between said inlet and between said outlet;
(c) a manually settable timer means connected to an electrical relay means adapted to selectively interrupt the electrical continuity of an electrical connection between said heating means and blower means and an AC power source; and
(d) an attachment arm connected to said housing having an electrical connector connectable to said AC power source positioned distal to said housing and containing a plurality of electrical conductors connecting said electrical connector and said electrical relay means.

7. A heater according to claim 6 further comprising:
(a) a DC battery as the power source for and connected to said timer and
(b) a DC battery charging means connected to said battery affixed within said housing.

8. A heater according to claim 6 further comprising a means for interrupting the AC power flow from said AC power source upon detection and comparison of any variation in the current flow to and from said electrical relay means.

9. A heater according to claim 8 wherein said means for interrupting is a ground fault interrupter circuit.

10. A heater according to claim 6 further comprising a thermostatic cutout means incorporated in said heating means positioned between said heating means and said outlet and adapted to electrically disconnect said heating means upon overheating.

11. A portable vehicle heater according to claim 6 wherein said attachment arm is a metal or plastic hanger.

12. A portable vehicle heater comprising:
(a) a housing:
(b) a plurality of ducts pivotally mounted on said housing allowing each of said ducts to be individually articulated in predetermined directions, said ducts having an inlet and outlet with an electrical heating means and a blower means positioned therein;
(c) a manually settable timer means connected to an electrical relay means adapted to selectively interrupt the electrical continuity of an electrical connection between said heating means and blower means and an AC power source; and
(d) an attachment arm connected to said housing having an electrical connector connectable to said AC power source positioned distal to said housing and containing a plurality of electrical conductors connecting said electrical connector and said electrical relay means.

13. A heater according to claim 6 further comprising a plurality of bumpers affixed to said housing adapted to space said housing away from the portion of the vehicle to which said heater is attached.

14. A heater according to claim 6 further comprising a first attachment means affixed to said attachment arm and a second attachment means affixed to said housing adapted to accept said first detachable attachment means in attachment orientation such that said attachment arm wraps partially around said housing.

15. A heater according to claim 14 wherein said first and second attachment means are made of velcro fabric strips affixed to said attachment arm and said housing.

16. A heater according to claim 1 wherein said plurality of ducts consists of a first duct pivotally mounted on a first side of said housing and a second duct pivotally mounted on a nonadjacent second side of said housing, said first and second ducts being independently directable such that said outlet of said first duct points in a different direction from said outlet of said second duct.

17. A portable vehicle heater according to claim 12 wherein said attachment arm is a metal or plastic hanger.

18. A portable vehicle heater comprising:
(a) a housing:
(b) a plurality of ducts attached electrically and mechanically to said housing, each having an inlet and an outlet with electrical heating means and a blower means positioned within said ducts, between said inlet and between said outlet;
(c) a manually settable timer means connected to an electrical relay means adapted to selectively interrupt the electrical continuity of an electrical circuit between said heating means and blower means and a remote AC power source, said timer means and relay means being located remotely from said housing and electrically attached to said heating and blower means through an electrical cord; and
(d) an attachment arm connected to said housing adapted for temporary attachment to a vehicle door or window such that said plurality of ducts are directed to the interior of said vehicle.

19. A heater according to claim 18 further comprising a means for interrupting the AC power flow from said AC power source upon detection and comparison of any variation in the current flow to and from said AC power source.

20. A heater according to claim 20 wherein said attachment arm is comprised of a tough, flexible band flexibly connected to said housing having incorporated therein a plurality of electrical conductors connecting an electrical connector on the end distal to the housing to said electrical blower and heater means inside housing, said electrical connector being connected to said electrical cord.

21. A portable vehicle according to claim 18, wherein said attachment arm is a hanger of metal or plastic.

* * * * *